United States Patent
Cao et al.

(10) Patent No.: US 10,855,964 B2
(45) Date of Patent: Dec. 1, 2020

(54) HUE MAP GENERATION FOR HIGHLIGHT RECOVERY

(71) Applicant: Apple Inc., Cupertino, CA (US)

(72) Inventors: Frederic Cao, Santa Clara, CA (US); Touraj Tajbakhsh, San Jose, CA (US); Muge Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 16/116,838

(22) Filed: Aug. 29, 2018

(65) Prior Publication Data

US 2020/0077066 A1    Mar. 5, 2020

(51) Int. Cl.
*H04N 9/64* (2006.01)
*H04N 5/232* (2006.01)
*H04N 9/73* (2006.01)

(52) U.S. Cl.
CPC .......... *H04N 9/643* (2013.01); *H04N 5/2327* (2013.01); *H04N 5/23229* (2013.01); *H04N 9/735* (2013.01)

(58) Field of Classification Search
CPC ...... H04N 9/643; H04N 9/76; H04N 5/23238; H04N 5/2254; H04N 5/2258; G06T 3/4038; G06T 5/006
USPC ........ 348/256, 645, 655, 649, 650; 358/522; 382/274
See application file for complete search history.

(56) References Cited

U.S. PATENT DOCUMENTS

| | | |
|---|---|---|
| 6,757,428 B1 | 6/2004 | Lin et al. |
| 8,164,594 B2 | 4/2012 | Watanabe et al. |
| 8,441,498 B2 | 5/2013 | Lammers et al. |
| 8,503,815 B2 | 8/2013 | Dvir |
| 8,537,177 B2 | 9/2013 | Bhaskaran et al. |
| 9,489,706 B2 | 11/2016 | Levy et al. |
| 9,635,332 B2 | 4/2017 | Carroll |
| 9,743,057 B2 | 8/2017 | Cote et al. |
| 10,070,109 B2 | 9/2018 | Lim et al. |
| 2003/0043391 A1 | 3/2003 | Childs et al. |
| 2003/0222991 A1 | 12/2003 | Muammar et al. |
| 2004/0109072 A1 | 6/2004 | Gallagher |
| 2007/0076277 A1 | 4/2007 | Miyawaki et al. |
| 2008/0117318 A1 | 5/2008 | Aoki |

(Continued)

FOREIGN PATENT DOCUMENTS

WO    WO2011/067755 A1    6/2011

OTHER PUBLICATIONS

Rouf, M. et al. "Gradient domain color restoration of clipped highlights," IEEE Computer Society Conference on Computer Vision and Pattern Recognition, 2012, 8 pages.

*Primary Examiner* — Xi Wang
(74) *Attorney, Agent, or Firm* — Fenwick & West LLP

(57) ABSTRACT

Embodiments relate to generation of hue maps for highlight recovery of an input image. An image having a plurality of color channels is obtained at a first resolution lower than a resolution of the input image. A hue for each color channel for each pixel is determined, using a pixel value for that color channel and pixel values for the plurality of color channels in the first image. Weights are determined for each pixel for each color channel, based on hues for the pixel and pixel values for the pixel in the first image. A plurality of candidate hue maps are generated, based on the weights and pixel values in the first image in a patch surrounding the pixel for the plurality of color channels.

18 Claims, 7 Drawing Sheets

(56) References Cited

U.S. PATENT DOCUMENTS

| | | |
|---|---|---|
| 2008/0285884 A1 | 11/2008 | Nishijima |
| 2011/0255779 A1* | 10/2011 | Sloan ................. H04N 1/60 |
| | | 382/167 |
| 2011/0280494 A1 | 11/2011 | Da Rocha Leitao et al. |
| 2012/0002082 A1 | 1/2012 | Johnson et al. |
| 2012/0201450 A1 | 8/2012 | Bryant et al. |
| 2012/0249828 A1* | 10/2012 | Sun ................. H04N 5/3572 |
| | | 348/223.1 |
| 2013/0208994 A1* | 8/2013 | Shirata ................. G06T 5/008 |
| | | 382/254 |
| 2013/0321679 A1 | 12/2013 | Lim et al. |
| 2015/0015740 A1 | 1/2015 | Cho et al. |
| 2015/0049939 A1 | 2/2015 | Siddiqui |
| 2016/0267686 A1* | 9/2016 | Ohta ................. G06T 7/11 |
| 2017/0070689 A1 | 3/2017 | Silverstein et al. |
| 2018/0007332 A1* | 1/2018 | Lim ................. H04N 9/643 |
| 2018/0211370 A1* | 7/2018 | Chen ................. H04N 1/6005 |

\* cited by examiner

HUE MAP GENERATION FOR HIGHLIGHT RECOVERY

BACKGROUND

1. Field of the Disclosure

The present disclosure relates to a circuit for processing images and more specifically to hue map generation for highlight recovery.

2. Description of the Related Arts

Image data captured by an image sensor or received from other data sources is often processed prior to further processing or consumption. For example, raw image data may be corrected, filtered, or otherwise modified before being provided to subsequent components such as a video encoder. Performing the image processing on a device uses system resources. For example, image processing algorithms may be performed by executing software programs on a central processing unit (CPU). However, the execution on the CPU consumes resources of the CPU and memory, and can interfere with processing of other tasks or increase power consumption.

SUMMARY

Embodiments of the present disclosure relate to generation of hue maps for highlight recovery of an input image. A first image (e.g., low-resolution image or thumbnail) comprising a plurality of color channels is obtained at a first resolution lower than a resolution of the input image. A hue for each color channel for each pixel in the first image is determined, using a corresponding pixel value for that color channel and corresponding pixel values for the plurality of color channels in the first image. A plurality of weights for the plurality of color channels are determined for each pixel in the first image, based on hues for that pixel for the plurality of color channels and corresponding pixel values for that pixel for the plurality of color channels in the first image. A plurality of candidate hue maps at the first resolution are generated for the plurality of color channels, based on the weights for each pixel and corresponding pixel values in the first image in a patch surrounding that pixel for the plurality of color channels.

Figure 1:
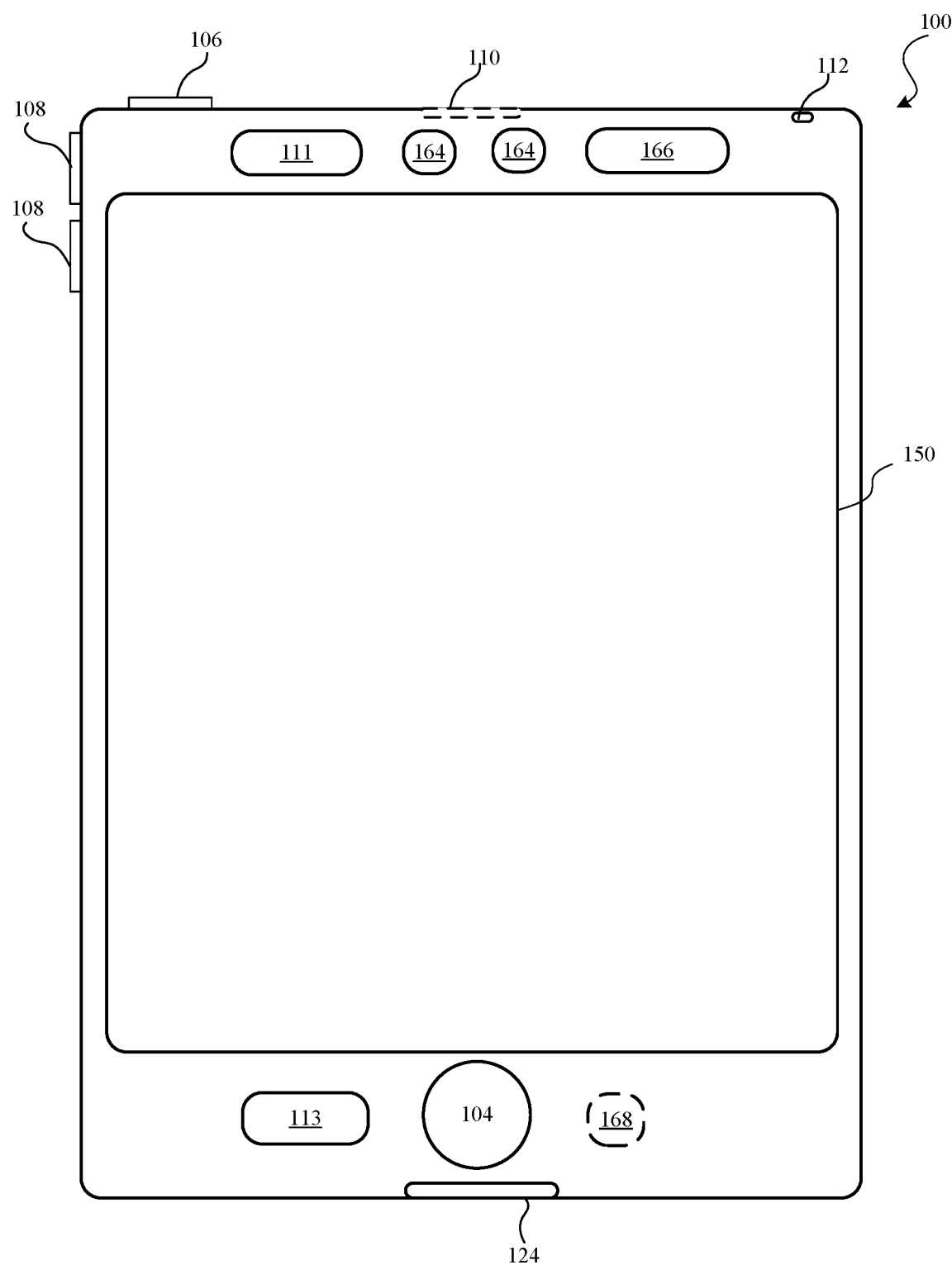
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to generating candidate hue maps for highlight recovery of overexposed portions of a high-resolution image. Candidate hue maps are generated using a low-resolution image (e.g., thumbnail). The thumbnail is captured immediately before or after capturing the high-resolution image. The thumbnail is captured at a lower exposure than that of the high-resolution image to reduce the probability of clipping pixel color channels. In addition to the thumbnail, the candidate hue maps can be generated using another low-resolution image (e.g., another thumbnail), wherein a resolution of the other thumbnail can be same as that of the thumbnail. The other thumbnail can be captured at the same time as the thumbnail at an exposure higher than that of the thumbnail (e.g., at the same exposure as that of the high-resolution image) to achieve motion compensation of the color motion between the thumbnail and the other thumbnail.

The term "hue" described herein refers to a representation of color of an image. For example, the hue of a pixel can be represented by a mix of Red, Green, and Blue channels. Compared to 'color', 'hue' represents a 2D property of color not comprising luminance. The terms "hue" and "color" are used interchangeably throughout this disclosure.

Color digital images are made of pixels, and pixels are made of combinations of primary colors represented by a series of code. An example RGB image has three channels: Red, Green, and Blue. The term "channel" described herein refers to one of the Red channel, the Green channel, or the Blue channel, of an image using the RGB color format.

The term "full-resolution" of an image described herein refers to the highest resolution of the image sensor used for capturing the image. The term "high-resolution" described herein refers to a resolution that is closer to the full-resolution than to a resolution of a low-resolution of the thumbnail as defined below.

The term "low-resolution" of an image described herein refers to a resolution that is much lower than the full-resolution. For example, if the full-resolution is 1920×1280 pixels, low-resolution may be 400×300 pixels or lower. The terms "low-resolution" and "thumbnail" are used interchangeably throughout this disclosure.

The image pixels as described herein have a default 8-bit range for hue values, for example from level 0 and level 255, unless otherwise specified.

The term "clipping" described herein refers to a color intensity of an area of the image (e.g., a pixel) that is higher than the maximum color intensity of the image sensor used to capture the image. For example, if the upper limit of the image sensor's hue dynamic range is represented by level 255, a pixel channel is deemed to be clipped when the actual color intensity of the pixel channel is higher than level 255

(e.g., level 400) even though the image sensor only registers a level 255 due to its finite dynamic range. The terms "clipping" and "saturation" are used interchangeably throughout this disclosure.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
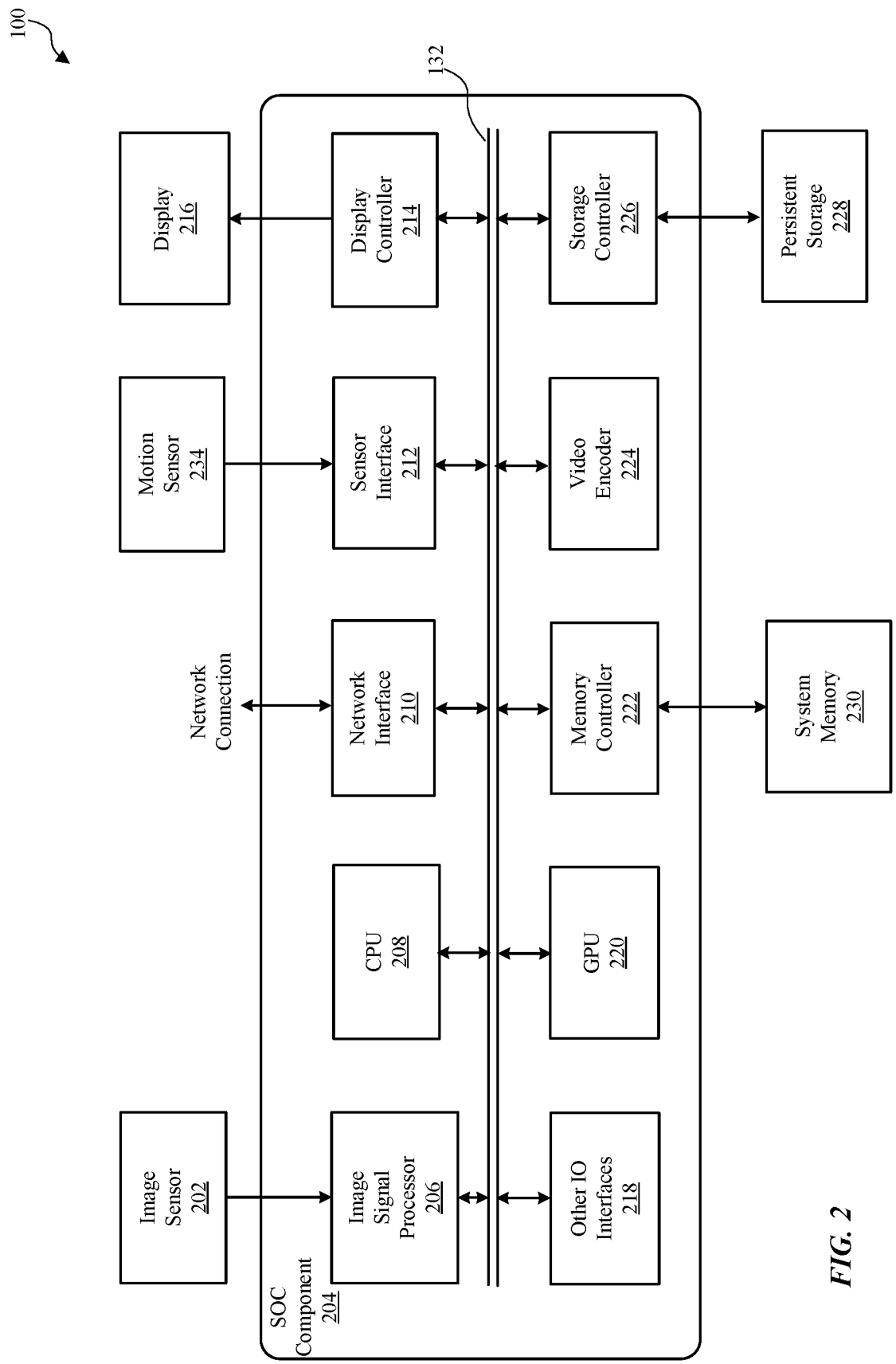
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 106 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 108 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
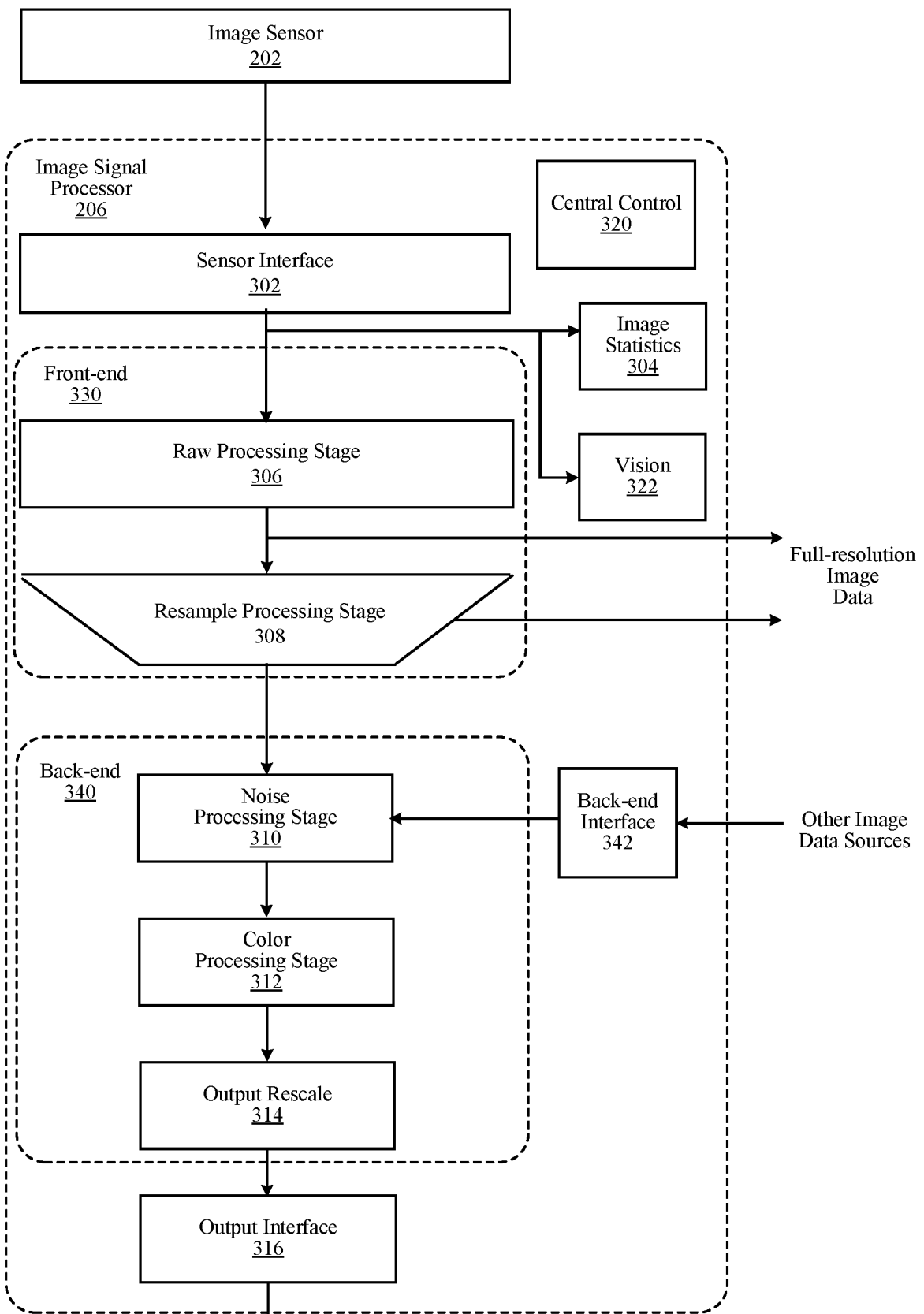
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity as a function of a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing cameral pose and object tracking. Keypoint detection refers to the process of identifying such keypoints in an image. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between input image data and output image data in order to correct artifacts and motion caused by sensor motion during the capture of the image frame. Output rescale may provide image data via output interface 316 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Image Signal Processing Pipeline for Hue Map Generation

Figure 4:
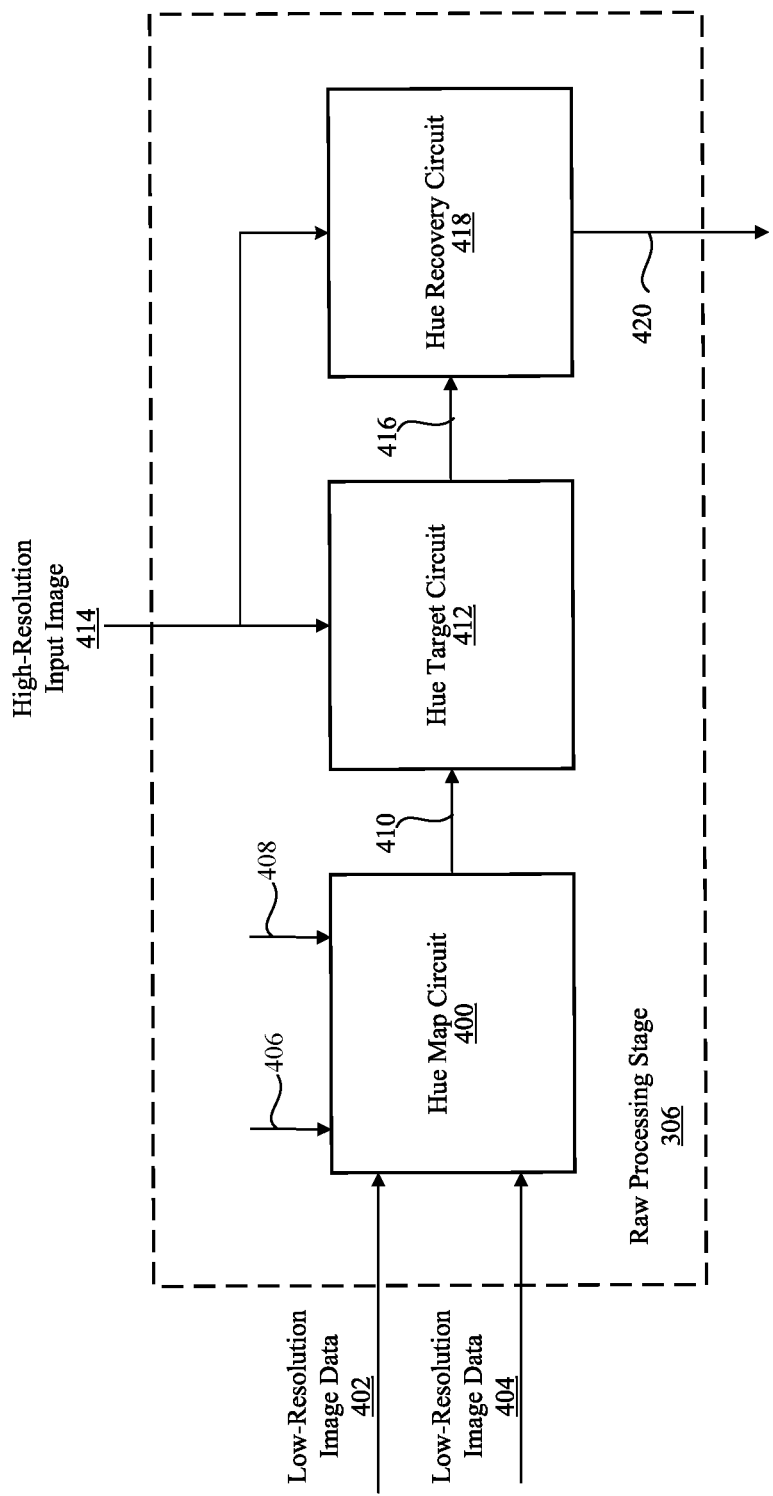
FIG. 4 is a block diagram illustrating a raw processing stage of the image processing pipeline of FIG. 3, according to one embodiment.

FIG. 4 is a block diagram illustrating raw processing stage 306 of the image processing pipeline of FIG. 3 for hue map generation used in highlight recovery of an input image, according to one embodiment. Raw processing stage 306 recovers clipped color channel(s) of a pixel by first generating candidate hue maps, determining target hue values for each color channel of the pixel and then determining recovered hue values for each color channel of the pixel. Raw processing stage 306 may include, among other components, Hue Map (HM) circuit 400 that generates candidate hue maps (with or without motion compensation), hue target circuit 412 for determining the target hue values from the candidate hue maps, and hue recovery circuit 418 for determining recovered hue values from the target hue values and a high-resolution input image. HM circuit 400, hue target circuit 412 and hue recovery circuit 418 may include various logic gates, registers and other circuits to implement their respective functions.

HM circuit 400 is a circuit that generates candidate hue maps 410 using thumbnail 402 and optionally using thumbnail 404 for motion compensation. For this purpose, HM circuit 400 receives low-resolution image data 402 (e.g., thumbnail), which can be captured immediately before or after image sensor 202 captures high-resolution input image 414 (hereinafter "input image"). Thumbnail 402 is captured at an exposure that is lower than that of input image 414 to reduce the possibility of clipping of the pixel color channels. For example, thumbnail 402 may be captured at an exposure value that is 8 times lower than that of input image 414. By capturing thumbnail 402 at a lower exposure value, thumbnail 402 likely avoids clipping color channels of its pixels. In one embodiment, none of the pixel color channels of thumbnail 402 are clipped such that every pixel color channel has an actual hue value that falls within the dynamic range of image sensor 202.

HM circuit 400 may optionally receive additional low-resolution image data 404 (e.g., thumbnail). Thumbnail 404 can be captured by image sensor 202 at the same time when image sensor 202 captures input image 414 at an exposure that is higher than that of thumbnail 402 (e.g., at the same exposure level as that of input image 414) to achieve motion compensation of the color motion between thumbnail 402 and thumbnail 404. Alternatively, thumbnail 404 is generated by downscaling of input image 414. Each thumbnail 402, 404 includes a plurality of color channels of a full-color format (e.g., RGB color format). HM circuit 400 may further receive lens shading coefficients 406, 408 for lens shading correction of thumbnails 402, 404, respectively.

HM circuit 400 may perform joint filtering of thumbnails 402, 404 as part of motion compensation process of color motion between thumbnails 402, 404. Candidate hue maps 410 represent a plurality of output low-resolution images (e.g., output thumbnails) compared to input image 414 having a plurality of color channels and capturing the same scene as input image 414. For example, if input image 414 includes 1920×1080 pixels, its corresponding thumbnail 402 may include 100×100 pixels and corresponding candidate hue maps 410 include 100×100 pixels. In this example, each candidate hue map 410 includes a candidate hue value for each color channel of the 100×100 pixels. While example embodiments of this disclosure use four output thumbnails for recovering clipped color channels, it is understood that the set of thumbnails may include fewer than or more than four thumbnails. More details about structure and operation of HM circuit 400 are described below with reference to FIGS. 5 through 7.

Hue target circuit 412 is a circuit that determines, based on candidate hue maps 410, target hue values 416 for each color channel of a pixel in input image 414 having clipped color channel(s). Hue target circuit 412 receives candidate hue maps 410 from HM circuit 400. Hue target circuit 412 further receives input image 414 that may include one or more pixels with clipped color channels. The high-resolution of input image 414 may be less than or equal to the full-resolution of image sensor 202. In one embodiment, input image 414 is received from image sensor 202 via sensor interface 302. Alternatively, input image 414 is received from a memory (e.g., from persistent storage 228 or system memory 230) that stores the image data captured by image sensor 202. Some of the pixels may include more than one clipped color channel. If a pixel includes two clipped color channels, the two clipped color channels may still be recovered based on the information of the unclipped third color channel. However, if all three color channels of pixel are clipped, it may not be possible to recover any of the three clipped color channels. Target hue values 416 generated by hue target circuit 412 are passed onto hue recovery circuit 418. Additional details regarding determining target hue values are discussed in U.S. application Ser. No. 15/198,354, filed on Jun. 30, 2016, which is incorporated by reference herein in its entirety.

Hue recovery circuit 418 is a circuit that recovers hue information in input image 414 and generates recovered image 420 with corrected hue information, based on target hue values 416. Hue recovery circuit 418 receives target hue values 416 for each color channel of a pixel along with input image, and hue recovery circuit 418 generates a recovered hue value for each color channel of the pixel. For each color channel, hue recovery circuit 418 determines two possible recovered hue values and mixes between them to smooth transitions. Hue recovery circuit 418 then blends the recovered hue value with that of an observed hue value of the pixel channel based on how close the observed hue value is from clipping for the given color channel. The observed hue value of a pixel as described herein is the hue value of the full resolution input image. For example, if the observed hue value is far from the clipping value (e.g., level 50 on a scale of 0-255), hue recovery circuit 418 selects the observed hue value and if the observed hue value is close to clipping (e.g., level 225 on the scale of 0-255) or actually clipped (e.g., level 255 on the scale of 0-255), the recovered hue value is selected. Hue recovery circuit 418 may also perform soft clipping to ensure that the recovered values stay with the maximum hue values for each color channel (e.g., within level 255 on a scale ranging from level 0 to 255). Hue recovery circuit 418 may also perform hue preservation to preserve any hue values that might have altered during soft clipping. Additional details regarding generating recovered hue values are discussed in U.S. application Ser. No. 15/198, 354, filed on Jun. 30, 2016.

Example Circuitry for Hue Map Generation

Figure 5:
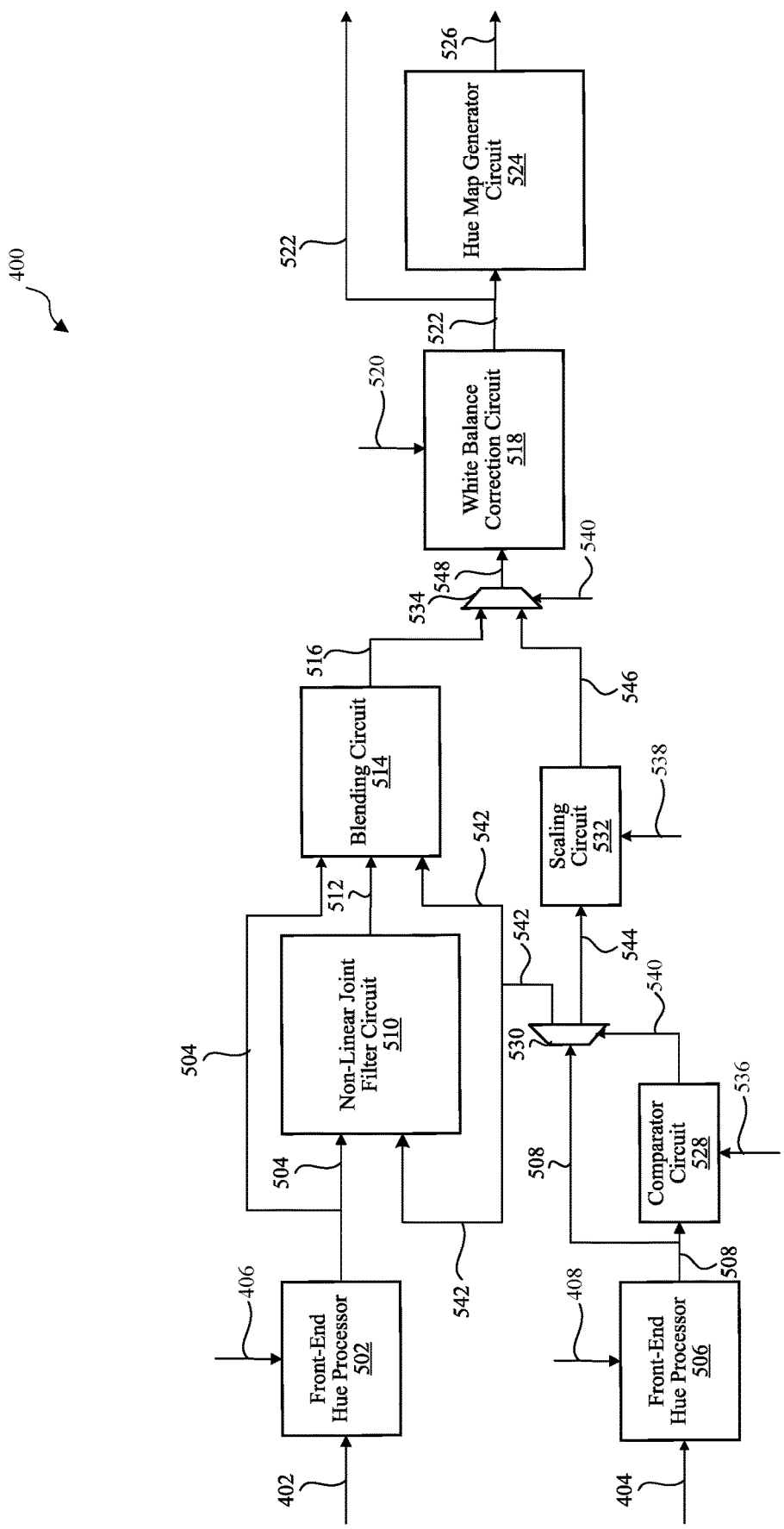
FIG. 5 is a block diagram illustrating circuitry for hue map generation with motion compensation, according to one embodiment.

FIG. 5 is a detailed block diagram illustrating HM circuit 400 of FIG. 4, according to one embodiment. Thumbnail 402 is passed onto front-end hue processor 502 that performs pre-processing of thumbnail 402 to generate pre-processed thumbnail 504. The processing performed at front-end hue processor 502 may include adjusting data format of pixel values in thumbnail 402 by performing, e.g., byte swapping and bit shifting of each pixel value in thumbnail 402, performing black level compensation (BLC) using a black level offset and gain, and performing lens shading correction using lens shading coefficients 406 to generate pre-processed thumbnail 504. Lens shading correction using lens shading coefficients is discussed in detail, for example, in U.S. Pat. No. 9,743,057, issued on Aug. 22, 2017, which is incorporated by reference herein in its entirety. In some embodiments, the front-end processing of thumbnail 402 is disabled and front-end processor 502 is bypassed. Thus, thumbnail 504 may correspond to thumbnail 402.

If motion compensation is enabled, pre-processed thumbnail 504 is passed onto non-linear joint filter circuit 510 for further filtering to achieve motion compensation. Furthermore, other thumbnail 404 is passed onto front-end hue processor 506. Front-end hue processor 506 performs substantially the same pre-processing operations as front-end hue processor 502, i.e., front-end hue processor 506 performs data format adjustment, BLC compensation and lens shading correction (e.g., using lens shading coefficients 408) of each color channel of thumbnail 404 to generate pre-processed thumbnail 508. In some embodiments, the front-end processing of thumbnail 404 is disabled and front-end processor 506 is bypassed. Thus, thumbnail 508 may correspond to thumbnail 404.

When motion compensation is enabled, both non-linear joint filter circuit 510 and blending circuit 514 may be bypassed based on per pixel value of pre-processed thumbnail 508 (or based on per pixel value of thumbnail 404 when front-end hue processor 506 is bypassed). For a pixel position (x,y) in pre-processed thumbnail 508 (or in thumbnail 404), comparator circuit 528 determines whether a pixel value for a color channel in pre-processed thumbnail 508 is below configurable motion compensation bypass threshold value 536, and generates corresponding select bit 540 for demultiplexer 530. If the pixel value for the color channel in pre-processed thumbnail 508 is less than threshold value 536, then both non-linear joint filter circuit 510 and blending circuit 514 are bypassed. Instead of performing the joint filtering and blending, the pixel value for the color channel in pre-processed thumbnail 508 is passed via demultiplexer 530 as pixel value 544 onto scaling circuit 532. Scaling circuit 532 (e.g., multiplier) scales up pixel value 544 by configurable scaling factor 538 to obtain pixel value 546 for the color channel in the pixel position (x,y) of motion-compensated thumbnail 548.

For pixels in pre-processed thumbnail 508 that are not bypassed, non-linear joint filter circuit 510 performs joint filtering of pre-processed thumbnail 504 and pre-processed thumbnail 542 corresponding to pre-processed thumbnail 508 (or, alternatively, joint filtering of thumbnails 402 and 404 when front-end hue processors 502, 506 are bypassed) to generate filtered thumbnail 512 that represents a weighted average of pre-processed thumbnail 504. Weights (filter coefficients) of non-linear joint filter circuit 510 are computed for each pixel based on color differences between pixel values of pre-processed thumbnail 504 and pixel values of pre-processed thumbnail 542 for each color channel in a defined patch surrounding that pixel. In an embodiment, the weights of non-linear joint filter circuit 510 for the pixel are computed based on non-linear function (e.g., exponential function) of the color differences. A weight of non-linear joint filter circuit 510 is larger if a corresponding color difference for the pixel is smaller, and vice versa. For each pixel, non-linear joint filter circuit 510 applies the computed weights on pre-processed thumbnail 504 to generate filtered thumbnail 512 passed onto blending circuit 514. During generation of filtered thumbnail 512, a weighted average value of each pixel obtained after applying the computed weights for that pixel is normalized by a sum of the weights associated with the defined patch surrounding that pixel.

Blending circuit 514 performs blending of filtered thumbnail 512 with pre-processed thumbnail 504 to generate motion-compensated thumbnail 516. Blending circuit 514 computes, for each pixel, a first blending weight $w_1$ based on a sum of corresponding weights of non-linear joint filter circuit 510 for that pixel. The first blending weight for the pixel is larger if the sum of corresponding weights of non-linear joint filter circuit 510 for the pixel is smaller (i.e., if color differences between pre-processed thumbnail 504 and pre-processed thumbnail 542 in a patch surrounding the pixel are larger) and vice versa. This is to allow choosing pre-processed thumbnail 504 as motion-compensated thumbnail 516 (instead of filtered thumbnail 512) if no color in pre-processed thumbnail 504 is found in a defined patch surrounding each pixel to be similar to color of pre-processed thumbnail 542.

Blending circuit 514 further computes, for each pixel, a second blending weight $w_2$ based on color differences between filtered thumbnail 512 and pre-processed thumbnail 542 for that pixel and based on color differences between pre-processed thumbnail 504 and pre-processed thumbnail 542 for that pixel. The second blending weight allows for blending of filtered thumbnail 512 with pre-processed thumbnail 504 to avoid ambiguous color having a large weight. For each pixel, the second blending weight is smaller if a color difference between corresponding pixel values in filtered thumbnail 512 and pre-processed thumbnail 542 is smaller than a color difference between corresponding pixel values in pre-processed thumbnail 504 and pre-processed thumbnail 542, and vice versa. This is to allow choosing pre-processed thumbnail 504 as motion-compensated thumbnail 516 (instead of filtered thumbnail 512) if there is no motion during a time period between capturing thumbnail 402 and capturing thumbnail 404.

Blending circuit 514 further mixes, for each pixel, the first blending weight $w_1$ and the second blending weight $w_2$ to obtain a blending weight w for that pixel for blending filtered thumbnail 512 with pre-processed thumbnail 504. The first blending weight $w_1$ and the second blending weight $w_2$ are mixed to obtain the blending weight w represented as:

$$w=1-(1-w_1)*(1-w_2). \quad \text{Equation 1}$$

Blending circuit 514 performs blending between pre-processed thumbnail 504 and filtered thumbnail 512 for each color channel c and each pixel position (x,y) as:

$$Evn(x,y,c)=Evc(x,y,c)+w*(Evm(x,y,c)-Evc(x,y,c)), \quad \text{Equation 2}$$

where Evm(x,y,c) represents a pixel value for a corresponding color channel c and a pixel position (x,y) in pre-processed thumbnail 504, Evc(x,y,c) represents a pixel value for a corresponding color channel c and a pixel position (x,y) in filtered thumbnail 512, and Evn(x,y,c) represents a pixel value for a corresponding color channel c and a pixel position (x,y) in motion-compensated thumbnail 516.

If motion compensation is not enabled, front-end hue processor 506 is disabled as thumbnail 404 is not used. Also, non-linear joint filter circuit 510 and blending circuit 514 are bypassed. Thus, if motion compensation is not performed, motion-compensated thumbnail 516 corresponds to pre-processed thumbnail 504 generated by front-end hue processor 502.

When the non-linear joint filter circuit 510 and blending circuit 514 are bypassed, a pixel value for a pixel position (x,y) and a color channel c in motion-compensated thumbnail 546 is selected by multiplexer 534 based on corresponding select bit 540 (generated by comparator circuit 528) and passed as a corresponding pixel value of motion-compensated thumbnail 548 onto white balance correction circuit 518. Alternatively, another pixel value for the pixel position (x,y) and the color channel c in motion-compensated thumbnail 516 is selected by multiplexer 534 and passed as a corresponding pixel value of motion-compensated thumbnail 548 onto white balance correction circuit 518. White balance correction circuit 518 corrects motion-compensated thumbnail 548 with while balance gains 520. White balance correction circuit 518 performs multiplication between pixel values of motion-compensated thumbnail 548 for each color channel and white balance gain 520 for that color channel to generate motion-compensated corrected thumbnail 522 for that color channel. White balance gain 520 is normalized with respect to a color channel having a maximal gain. Thus, pixel values in motion-compensated corrected thumbnail 522 are gained down in white balance relative to pixel values of motion-compensated thumbnail 548.

Pixel values in motion-compensated corrected thumbnail 522 can be output as first output candidate hue map 522 having the plurality of color channels (e.g., three color channels for RGB color format). Motion-compensated corrected thumbnail 522 is also passed onto hue map generator circuit 524 for generating a plurality of candidate hue maps 526. Each candidate hue map 526 is a low-resolution output image (e.g., output thumbnail) generated by emphasizing hue for a corresponding color channel. Each candidate hue map 526 (output thumbnail) includes a plurality of channels per pixel location corresponding to the plurality of color channels in thumbnail 402. Thus, for RGB color format of thumbnail 402, each output thumbnail includes three color channels. More details about structure and operation of hue map generator circuit 524 are provided below in relation to FIG. 6.

Figure 6:
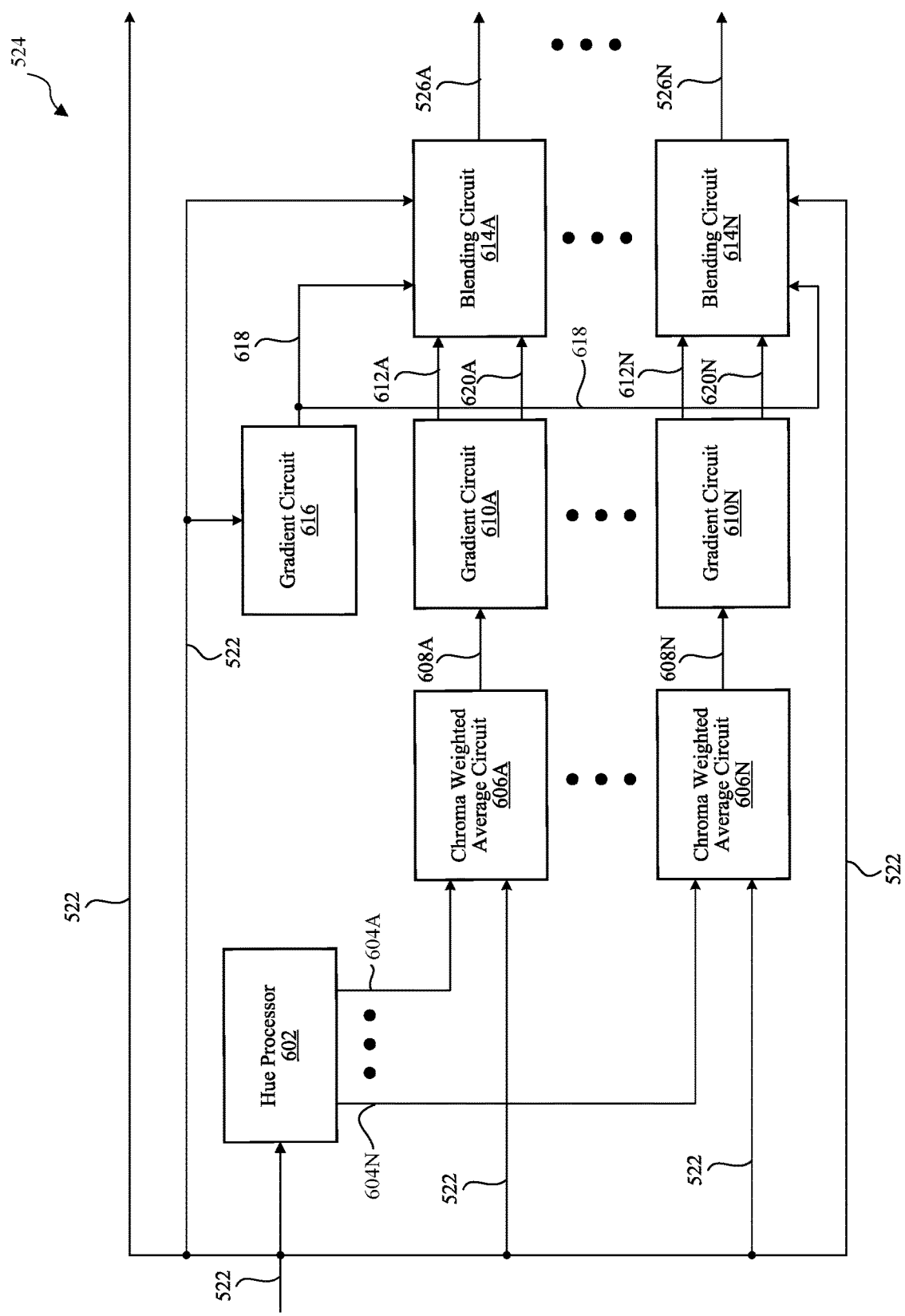
FIG. 6 is a block diagram illustrating circuitry for generating candidate hue maps, according to one embodiment.

FIG. 6 is a detailed block diagram of hue map generator circuit 524 of FIG. 5 for generating candidate hue maps 526, according to one embodiment. Motion-compensated corrected thumbnail 522 is passed onto hue processor 602. Hue processor 602 computes a hue for each color channel for each pixel in motion-compensated corrected thumbnail 522, using a corresponding pixel value for that color channel and reciprocal of a sum of corresponding pixel values for the plurality of color channels. Hue processor 602 then computes a plurality of color factors 604A through 604N for the plurality of color channels for each pixel, based on hues for the plurality of color channels for that pixel. In an embodiment when pixel values in motion-compensated corrected thumbnail 522 are represented in RGB color format, hue processor 602 computes three color factors for each pixel, i.e., redness, greenness and blueness. The redness is computed for each pixel as follows:

$$rness=r\_hue-max(g\_hue, b\_hue), \quad \text{Equation 3}$$

where rness represents a redness value of that pixel, r_hue represents a hue for red color channel of that pixel, g_hue represents a hue for green color channel of that pixel, and b_hue represents a hue for blue color channel of that pixel. Similarly, the greenness (gness) and blueness (bness) are computed for each pixel as follows:

$$gness=g\_hue-max(r\_hue, b\_hue), \quad \text{Equation 4}$$

$$bness=b\_hue-max(g\_hue, r\_hue). \quad \text{Equation 5}$$

Color factors 604A through 604N (e.g., redness, greenness, blueness) and motion-compensated corrected thumbnail 522 are passed onto chroma weighted average circuits 606A through 606N. Chroma weighted average circuits 606A through 606N first compute, for each pixel, color weights for the plurality of color channels. Each color weight for a corresponding color channel is computed for each pixel based on a corresponding color factor 604A through 604N and a corresponding pixel value of motion-compensated corrected thumbnail 522 for the corresponding color channel. The color weight for the corresponding color channel of the pixel is effectively determined based on the chroma in the corresponding color channel of the pixel. For example, a weight based on the redness (i.e., w_rness) of the pixel is computed (e.g., by chroma weighted average circuit 606A) as:

$$w\_rness=TW\_R*2^{(ChromaPower*rness)}, \quad \text{Equation 6}$$

where TW_R represents a pixel value of motion-compensated corrected thumbnail 522 for Red color channel, and ChromaPower is a configurable chroma intensity factor. The weight based on the redness computed according to Equation 6 is determined by two terms. The first term TW_R in Equation 6 is related to an absolute value of Red color channel, which is luminance dependent. The second term $2^{(ChromaPower*rness)}$ in Equation 6 is based on the redness of the pixel, which is luminance invariant. It can be observed from Equation 6 that the more "redness" the pixel features, the determined weight is higher. Other weights based on the greenness and blueness of the pixel are similarly computed by the corresponding chroma weighted average circuit 606.

Chroma weighted average circuits 606A through 606N then compute hue maps 608A through 608N for the plurality of color channels. Chroma weighted average circuits 606A through 606N apply the color weights for each pixel to corresponding pixel values of motion-compensated corrected thumbnail 522 for a patch of pixels surrounding that pixel, accumulate the weighted pixel values over the patch of pixels and normalize the accumulation to effectively produce a chroma weighted average of motion-compensated corrected thumbnail 522 for each color channel. Each hue map 608A through 608N represents an output low-resolution image (output thumbnail) that emphasizes a different color channel of a plurality of color channels. Also, each hue map 608A through 608N includes pixel values for the plurality of color channels. For example, hue map 608A emphasizing the redness of motion-compensated corrected thumbnail 522 is computed as weighted average (using w_rness from Equation 6) of corresponding pixel values of motion-compensated corrected thumbnail 522 for a patch of pixels (e.g., 3×3 pixels) surrounding each pixel. Similarly, hue maps 608B and 608C emphasizing the greenness and blueness respectively of motion-compensated corrected thumbnail 522 are computed.

Referring back to FIG. 4, as thumbnail 402 (and thumbnail 404) is a low-resolution image, thumbnail 402 may not be sufficiently representative of high-resolution input image 414, especially along edges or high frequency components of input image 414. If thumbnail 402 itself features a large gradient (e.g., a value of gradient above a threshold gradient) in a certain portion of thumbnail 402, it can be anticipated that input image 414 also features a large gradient in a corresponding portion of input image 414. The hue being estimated near large color gradients may not be as accurate as the hue estimated out of a "flat area" having smaller gradients (e.g., below the threshold gradient). Therefore, the hue in a region of large gradient would be unreliable. Thus, penalty for a large hue gradient is applied herein so that the large hue gradient weights less.

Referring back to FIG. 6, gradient circuits 610A through 610N apply the gradient penalty to hue maps 608A through 608N passed onto corresponding gradient circuits 610A through 610N. Each gradient circuit 610A through 610N computes a hue for each color channel for each pixel in a corresponding hue map 608A through 608N, using a corresponding pixel value for that color channel and reciprocal of a sum of corresponding pixel values for the plurality of color channels. Each gradient circuit 610A through 610N then calculates, for each pixel, corresponding gradient 620A through 620N for a corresponding color channel based on corresponding gradient values for the plurality of color channel. A gradient value for a color channel is computed based on corresponding hues for the color channel for a patch of pixels surrounding that pixel (e.g., four immediate neighbors and a central pixel). A gradient value for a color channel can be defined as a difference between a maximal of hues in the patch and a minimal of hues in the patch for the color channel. Each gradient circuit 610A through 610N calculates, for each pixel, corresponding gradient 620A through 620N for a corresponding color channel as a maximal of computed gradient values for the plurality of channels. Each gradient circuit 610A through 610N then calculates, for each pixel, a gradient penalty term for a corresponding color channel as:

$$\text{grad\_term}(c) = 2^{(-\text{grad}(c) * \text{gradCoeff})} \quad \text{Equation 7}$$

where grad_term(c) represents a gradient penalty term for a color channel c, grad(c) represents corresponding gradient 620A through 620N for a color channel c, and gradCoeff represents a configurable gradient coefficient.

Each gradient circuit 610A through 610N then calculates a corresponding modified hue map 612A through 612N associated with a corresponding color channel by multiplying pixel values of corresponding hue map 608A through 608N for each color channel and a gradient penalty term for the corresponding color channel. Modified hue maps 612A through 612N are thus obtained by applying gradient penalty on hue maps 608A through 608N. Modified hue maps 612A through 612N associated with a plurality of color channels may be then passed along with gradients 620A through 620N onto corresponding blending circuits 614A through 614N, as shown in FIG. 6.

Gradient circuit 616 computes a hue for each color channel for each pixel in a corresponding motion-compensated corrected thumbnail 522 for that color channel, using a corresponding pixel value for that color channel and reciprocal of a sum of corresponding pixel values for the plurality of color channels. Gradient circuit 616 then calculates, for each pixel, gradient 618 based on corresponding gradient values for the plurality of color channel. A gradient value for a color channel is computed based on corresponding hues for the color channel for a patch of pixels surrounding that pixel (e.g., four immediate neighbors and a central pixel). Gradient circuit 616 calculates, for each pixel, gradient 618 as a maximal of computed gradient values for the plurality of color channels. Gradients 618 computed by gradient circuit 616 for all pixels in motion-compensated corrected thumbnail 522 are passed onto blending circuits 614A through 614N.

Each blending circuit 614A through 614N performs blending of pixel values of motion-compensated corrected thumbnail 522 and pixel values of a corresponding modified hue map 612A through 612N to generate a corresponding candidate hue map 526A through 526N associated with a corresponding color channel. Motion-compensated corrected thumbnail 522 is mixed with a corresponding modified hue map 612A through 612N based on per pixel gradient 618 and per pixel gradient 620A through 620N computed by a corresponding gradient circuit 610A through 610N for a corresponding color channel. As noted above, hue values located around large gradients are likely less reliable. Thus, the blending based on per pixel gradients performed by blending circuits 614A through 614N provides more reliable hue candidates.

Each candidate hue map 526A through 526N is a low-resolution output image (e.g., output thumbnail) generated by emphasizing a corresponding color. For example, for RGB color format of thumbnails 402 and 404, candidate hue maps 526A through 526N are three output thumbnails generated by emphasizing a corresponding color. Each candidate hue map 526A through 526N (output thumbnail) includes a plurality of channels per pixel location corresponding to the plurality of color channels in thumbnails 402, 404. Thus, for RGB color format of thumbnail 402, each output thumbnail 526A through 526N includes three color channels. Accordingly, for RGB color format of thumbnails 402, 404, there are 12 color channels in all the candidate hue maps, i.e., first output candidate hue map 522 with three color channels, and candidate hue maps 526A, 526B, 526 C each having three color channels. First output candidate hue map 522 and candidate hue maps 526A through 526N represent candidate hue maps 410 passed onto hue target circuit 412 in FIG. 4. In an alternative embodiment, gradient circuits 610A through 610N, gradient circuit 616 and blending circuits 614A through 614N can be disabled. In this case, candidate hue maps 526A through 526N are hue maps 608A through 608N generated by chroma weighted average circuits 606A through 606N.

Example Process for Generating Hue Maps

Figure 7:
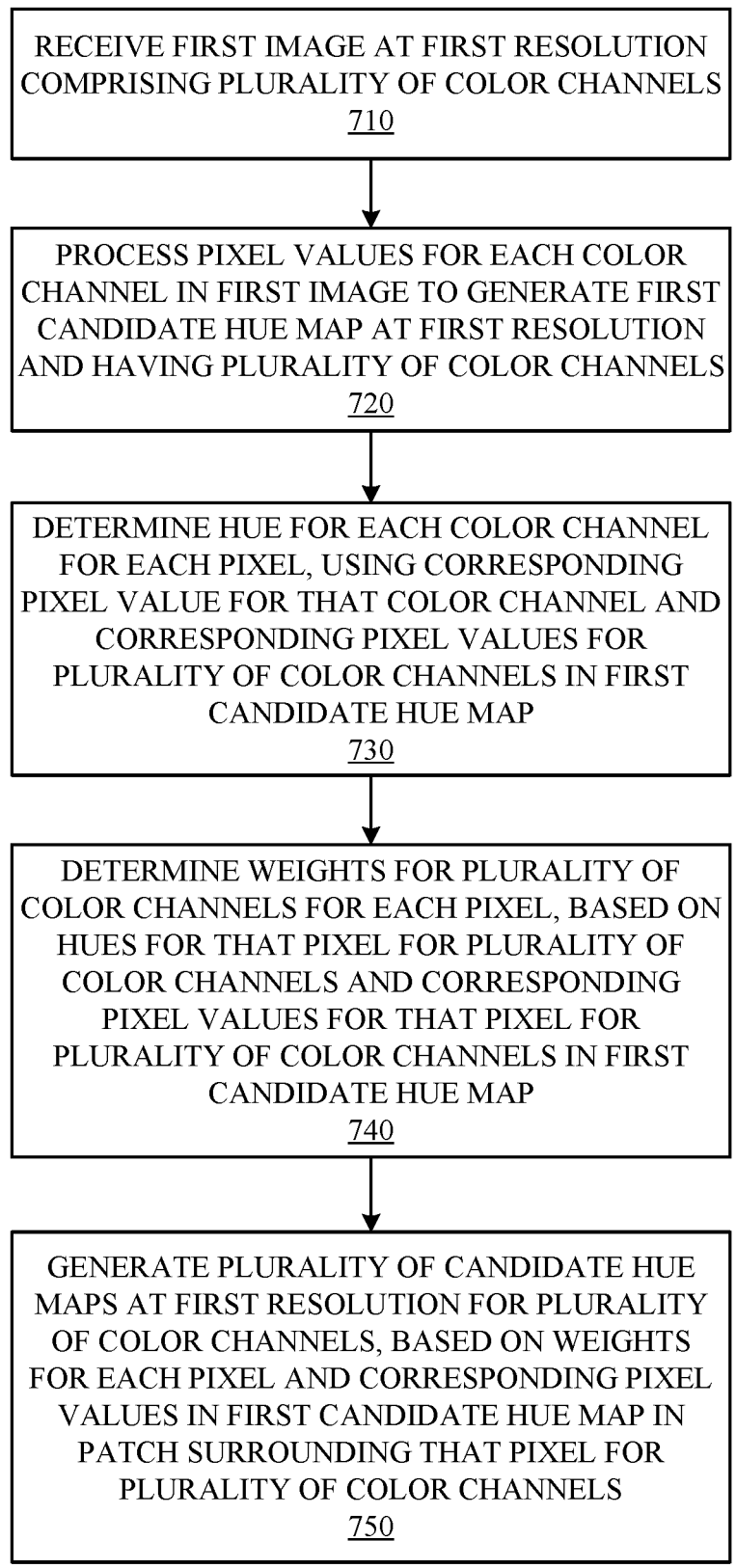
FIG. 7 is a flowchart illustrating a method of generating candidate hue maps, according to one embodiment.

FIG. 7 is a flowchart illustrating a method of generating candidate hue maps, according to one embodiment. The method may include additional or fewer steps, and steps may be performed in different orders. HM circuit 400, as described with reference to FIG. 4 through FIG. 6, receives 710 a first image at a first resolution comprising a plurality of color channels. The received first image is a low-resolution image data (e.g., thumbnail) captured immediately before or after capturing a high-resolution input image at a lower exposure than that of the high-resolution input image to reduce the probability of clipping pixel color channels.

HM circuit 400 processes 720 a plurality of pixel values for each color channel in the first image to generate a first candidate hue map at the first resolution having the plurality of color channels. HM circuit 400 may perform front-end processing of the first image (e.g., via front-end processor 502 of FIG. 5) and may also perform motion compensation on the first image (e.g., via non-linear joint filter 510 and blending circuit 514 of FIG. 5) to generate a motion compensated version of the first image representing the first candidate hue map. In some embodiments, both the front-end processing and motion compensation are disabled, and the first image (i.e., captured thumbnail) represents the first candidate hue map.

HM circuit 400 determines 730 a hue for each color channel for each pixel in the first image, using a corresponding pixel value for that color channel and corresponding pixel values for the plurality of color channels in the first candidate hue map. HM circuit 400 then determines (via hue processor 602 of FIG. 6) a plurality of color factors (e.g., redness, greenness, and blueness) for the plurality of color channels for each pixel, based on hues computed by HM circuit 400 for the plurality of color channels for that pixel.

HM circuit 400 determines 740 a plurality of weights for the plurality of color channels for each pixel in the first image, based on hues for that pixel for the plurality of color channels and corresponding pixel values for the plurality of color channels for that pixel in the first candidate hue map. HM circuit 400 determines for each pixel (e.g., via corresponding chroma weighted average circuit 606 of FIG. 6) a weight of the plurality of weights for each color channel, based on the color factor and a pixel value in the first candidate hue map for a corresponding color channel.

HM circuit 400 generates 750 a plurality of candidate hue maps at the first resolution for the plurality of color channels, based on the weights for each pixel and corresponding pixel values in the first candidate hue map in a patch surrounding that pixel for the plurality of color channels. Each candidate hue map represents an output low-resolution image (output thumbnail) that emphasizes a different color of the plurality of color channels. Each candidate hue map includes pixel values for the plurality of color channels. The candidate hue maps may be further processed by applying gradient penalty to generate a plurality of modified candidate hue maps. The modified candidate hue maps may be mixed with the first candidate hue map to generate a plurality of output candidate hue maps.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for processing an input image, comprising:
  a filter circuit configured to:
    determine filter coefficients for each pixel in a first image at a first resolution lower than a resolution of the input image and captured within a threshold time interval from capturing the input image, using differences between pixel values of the first image and other pixel values of a second image for each color channel of a plurality of color channels in a patch surrounding each pixel, the second image at the first resolution having the plurality of color channels, and
    filter the pixel values of the first image for each color channel using the filter coefficients for each pixel to generate a filtered image having the plurality of color channels; and
  a hue map generator circuit configured to:
    determine a hue for each color channel for each pixel in the filtered image, using a corresponding pixel value for each color channel and corresponding pixel values for the plurality of color channels in the filtered image,
    determine a plurality of weights for the plurality of color channels for each pixel in the filtered image, based on hues for each pixel for the plurality of color channels and the corresponding pixel values, and
    generate a plurality of candidate hue maps at the first resolution for the plurality of color channels, based on the weights for each pixel and pixel values in the filtered image in a patch surrounding each pixel for the plurality of color channels.

2. The apparatus of claim 1, further comprising:
  a hue target circuit configured to generate a target hue for a pixel in the input image, based on the plurality of candidate hue maps; and
  a hue recovery circuit to generate a recovered version of the input image by adjusting hue information of the pixel in the input image based on the generated target hue, the input image comprising the pixel with the hue information having a clipped color channel.

3. The apparatus of claim 1, further comprising:
  a front-end hue processor configured to process a plurality of pixel values for each color channel in the first image to generate a first candidate hue map at the first resolution and having the plurality of color channels.

4. The apparatus of claim 3, wherein the front-end hue processor is further configured to:
  apply at least one of black level compensation and lens shading correction on the pixel values for each color channel in the first image.

5. The apparatus of claim 3, further comprising a white balance correction circuit configured to:
  correct one or more pixel values for each color channel in the first candidate hue map based on a white balance gain for each color channel to generate a corrected version of the first candidate hue map.

6. The apparatus of claim 1, further comprising a blending circuit configured to:
  determine a first blending weight for each pixel in the filtered image, based on the filter coefficients for each pixel in the first image,
  determine a second blending weight for each pixel in the filtered image, based on differences between pixel values of the filtered image and the second image and on differences between pixel values of the first and second images for the plurality of color channels,
  determine a blending weight for each pixel in the filtered image, based on the first blending weight and the second blending weight, and
  generate a motion compensated image having the plurality of color channels, using the blending weight for each pixel in the filtered image, the filtered image and the first image.

7. The apparatus of claim 6, further comprising a white balance correction circuit configured to:

correct one or more pixel values for each color channel in the motion compensated image based on a white balance gain for each color channel.

8. The apparatus of claim 1, wherein the hue map generator circuit is further configured to:
   determine, for each pixel in the filtered image, a color factor for each color channel, based on hues for each pixel in the filtered image for the plurality of color channels, and
   determine, for each pixel in the filtered image, a weight of the plurality of weights for each color channel, based on the color factor and a pixel value in the filtered image for a corresponding color channel of the plurality of color channels.

9. The apparatus of claim 1, wherein the hue map generator circuit is further configured to:
   determine for each color channel a gradient for each pixel in the filtered image, using corresponding pixel values in a candidate hue map of the plurality of candidate hue maps for each color channel, and
   generate a modified hue map for each color channel, based on a corresponding candidate hue map of the plurality of candidate hue maps for each color channel and the gradient for each pixel for each color channel.

10. A method, comprising:
    determining filter coefficients for each pixel in a first image at a first resolution lower than a resolution of the input image and captured within a threshold time interval from capturing the input image, using differences between pixel values of the first image and other pixel values of a second image for each color channel of a plurality of color channels in a patch surrounding each pixel, the second image at the first resolution having the plurality of color channels;
    filtering the pixel values of the first image for each color channel using the filter coefficients for each pixel to generate a filtered image having the plurality of color channels;
    determining a hue for each color channel for each pixel in the filtered image, using a corresponding pixel value for each color channel and corresponding pixel values for the plurality of color channels in the filtered image;
    determining a plurality of weights for the plurality of color channels for each pixel in the filtered image, based on hues for each pixel for the plurality of color channels and the corresponding pixel values; and
    generating a plurality of candidate hue maps at the first resolution for the plurality of color channels, based on the weights for each pixel and pixel values in the filtered image in a patch surrounding each pixel for the plurality of color channels.

11. The method of claim 10, further comprising:
    generating a target hue for a pixel in the input image, based on the plurality of candidate hue maps; and
    generating a recovered version of the input image by adjusting hue information of the pixel in the input image based on the generated target hue, the input image comprising the pixel with the hue information having a clipped color channel.

12. The method of claim 10, further comprising:
    processing a plurality of pixel values for each color channel in the first image to generate a first candidate hue map at the first resolution and having the plurality of color channels.

13. The method of claim 12, further comprising:
    applying at least one of black level compensation and lens shading correction on the pixel values for each color channel in the first image.

14. The method of claim 10, further comprising:
    determining a first blending weight for each pixel in the filtered image, based on the filter coefficients for each pixel in the first image;
    determining a second blending weight for each pixel in the filtered image, based on differences between pixel values of the filtered image and the second image and on differences between pixel values of the first and second images for the plurality of color channels;
    determining a blending weight for each pixel in the filtered image, based on the first blending weight and the second blending weight; and
    generating a motion compensated image having the plurality of color channels, using the blending weight for each pixel in the filtered image, the filtered image and the first image.

15. The method of claim 14, further comprising:
    correcting one or more pixel values for each color channel in the motion compensated image based on a white balance gain for each color channel.

16. The method of claim 10, wherein computing the plurality of weights comprises:
    determining, for each pixel in the filtered image, a color factor for each color channel, based on hues for each pixel in the filtered image for the plurality of color channels; and
    determining, for each pixel in the filtered image, a weight of the plurality of weights for each color channel, based on the color factor and a pixel value in the filtered image for a corresponding color channel of the plurality of color channels.

17. The method of claim 10, further comprising:
    determining for each color channel a gradient for each pixel in the filtered image, using corresponding pixel values in a candidate hue map of the plurality of candidate hue maps for each color channel; and
    generating a modified hue map for each color channel, based on a corresponding candidate hue map of the plurality of candidate hue maps for each color channel and the gradient for each pixel for each color channel.

18. An electronic device, comprising:
    an image sensor configured to:
      capture a first image at a first resolution comprising a pixel with hue information having a clipped color channel, and
      capture a second image at a second resolution lower than the first resolution and having a plurality of color channels, the second image captured at an exposure level lower than an exposure level of the first image and within a threshold time interval from capturing the first image; and
    an image signal processor coupled to the image sensor, the image signal processor configured to perform raw processing of the first image to obtain a raw processed version of the first image having the plurality of color channels, the image signal processor including:
      a filter circuit configured to:
        determine filter coefficients for each pixel in the second image, using differences between pixel values of the second image and other pixel values of a third image for each color channel in a patch surrounding each pixel, the third image at the second resolution having the plurality of color channels, and filter the pixel values of the second image for each color channel using the filter coefficients for each pixel to generate a filtered image having the plurality of color channels; and a hue map generator circuit configured to:
determine a hue for each color channel for each pixel in the filtered image, using a corresponding pixel value for each color channel and corresponding pixel values for the plurality of color channels in the filtered image, determine a plurality of weights for the plurality of color channels for each pixel in the filtered image, based on hues for each pixel for the plurality of color channels and the corresponding pixel values, and generate a plurality of candidate hue maps at the second resolution for the plurality of color channels, based on the weights for each pixel and pixel values in the filtered image in a patch surrounding each pixel for the plurality of color channels.

* * * * *